W. E. HORROCKS.
NUT AND BOLT.
APPLICATION FILED NOV. 10, 1909.
976,569.
Patented Nov. 22, 1910.
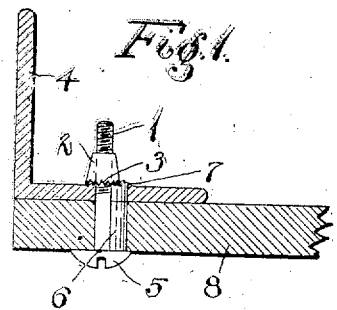
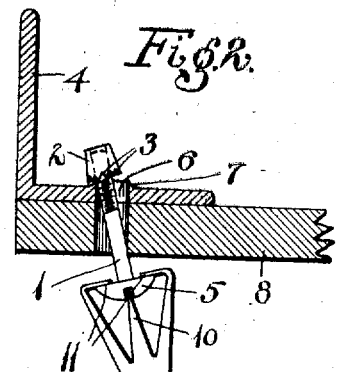
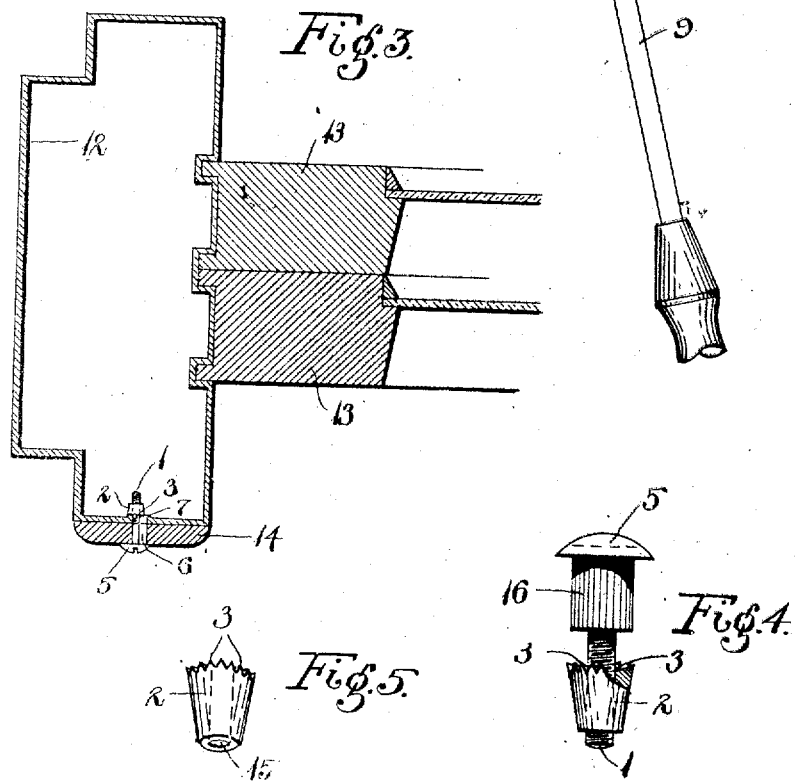
Witnesses:
Monroe E. Miller
Edward M. Wise
Walter E. Horrocks, Inventor,
By Geo. E. Tew
Attorney.

UNITED STATES PATENT OFFICE.

WALTER E. HORROCKS, OF LAKEWOOD, OHIO.

NUT AND BOLT.

976,569.  Specification of Letters Patent.  Patented Nov. 22, 1910.

Application filed November 10, 1909.  Serial No. 527,187.

*To all whom it may concern:*

Be it known that I, WALTER E. HORROCKS, a citizen of the United States, residing at Lakewood, in the county of Cuyahoga and State of Ohio, have invented certain new and useful Improvements in Nuts and Bolts, of which the following is a specification.

This invention relates to nuts and bolts, and has for its object to provide means for bolting together two objects where it is impossible to use the ordinary nut and bolt. To this end, there is provided a bolt having a suitable head, and carrying a novel nut having frictional means on its inner end or face. The nut and bolt are applied to their objects by punching or drilling a hole, slightly larger than the nut, through the objects, leaving a bur or rough edge on the inner edge of the hole, and then inserting the nut which is on the end of the bolt, through the hole and shifting or swinging the bolt so the inner frictional face of the nut engages the bur. The nut having engaged the inner object by means of the bur is held unrevoluble, and the bolt can be screwed in to tighten or hold the objects together.

The invention is illustrated in the accompanying drawings, in which:

Figure 1 is a sectional view, showing the nut and bolt applied to an angle iron. Fig. 2 is a similar view, showing the method of applying the nut and bolt. Fig. 3 is a cross sectional view of the nut and bolt as applied to bolting a strip of wood, or the like, to a metal sash casing. Fig. 4 is a side view of the nut, partly broken away, and a modified bolt. Fig. 5 is a perspective of the nut.

Referring specifically to the drawings, in which similar numerals of reference indicate similar parts, 1 is the bolt having a head 5 of any convenient size or style.

The nut 2 consists of a cylindrical tapered body having the usual threaded bore 15, and having the wide end or base countersunk, and the outer edge thereof toothed or serrated as shown at 3.

4 indicates an angle iron to which a plate 8 is to be secured. A hole 6 has been drilled or punched through the said plate and angle iron, leaving a bur 7 on the inner edge thereof.

12 is a metal sash casing bearing sashes 13.

14 is a strip of wood or other material which is secured to the casing 13, for purpose of decoration, or otherwise.

For use in securing or applying a screw headed bolt, a screw driver 9 is provided having a blade 10 and lips 11 to engage the inner face of the head. The screw driver is applied to the head of the bolt as shown in Fig. 2. In this manner the bolt is held rigid with the screw-driver.

The modified form shown in Fig. 4 is the same as the other construction, except a shoulder 16 on the bolt, which may be preferable in some cases.

In use, the nut 2 being slightly smaller than the hole 6 and being tapered is easily inserted in the hole 6. When inside the inner object, the bolt 1 is swung or shifted to bring the serrated edge over the bur 7. The end of the nut being countersunk as well as serrated assures a positive engagement between the nut and the inner object, the countersink allowing the nut to lap over the bur 7. The head 5 in contacting with the inner object, straightens the bolt and if the head 5 is large enough, which is preferable, closes the hole.

The device can be used in many cases when it is impossible to get at both sides of the object or objects, especially in structural work, metal sash casings, and the like.

It will be seen also that the device can be applied to a single object, tank, or the like, to close a hole therein.

Having described my invention, I claim as new:

1. The combination of an object having a hole therethrough the edge of the object at one end of the hole being burred, a bolt extending through the hole, the said bolt being disposed to one side of the center of the hole, and a nut on the bolt of smaller diameter than the hole, the base of the nut being serrated and engaging the bur, as and for the purpose described.

2. The combination of an object having a hole therethrough the edge of the object at one end of the hole being burred, a bolt extending through the hole, the said bolt being disposed to one side of the center of the hole, and a nut on the bolt of smaller diameter than the hole, said nut having the base thereof countersunk, and serrated at its outer edge, and engaging the bur, as and for the purpose described.

In testimony whereof, I do affix my signature in presence of two witnesses.

WALTER E. HORROCKS.

Witnesses:
JOHN A. BOMMHARDT,
MONROE E. MILLER.